Patented Feb. 20, 1951

2,542,566

UNITED STATES PATENT OFFICE 2,542,566

2,2',4,4'-TETRAHYDROXYBIPHENYL COUPLING COMPONENT FOR DIAZOTYPE LAYERS

George Wesley Pedlow, Jr., McElhattan, Pa., and Fred W. Neumann, Phillipsburg, N. J., assignors to General Aniline & Film Corporation, New York, N. Y., a corporation of Delaware No Drawing. Application December 17, 1947, Serial No. 792,336

6 Claims. (Cl. 95—6)

This invention relates to diazotype light-sensitive media and, more particularly, to the use of certain azo components in the light-sensitive layer of a diazotype reproduction medium or in a developing solution for treatment of the exposed diazotype image.

In the photo-reproduction of line or continuous tone originals by means of the diazotype process, such as tracings or semi-transparent engineering drawings or typewritten documents by the diazotype positive reproduction method, it is highly desirable that the image be reproduced in a shade which will give high contrast to the reproduced lines or other figures of the original. The photo-reproduction must also be fast to light and to water and possess good photographic density. Accordingly, the selection of dye components for the production of the light-sensitive layer and the developer cannot be made merely on the basis of obtaining diazo compounds and azo coupling components which will couple to produce a desired shade. It is necessary that the choice of the light-sensitive diazo compound and the coupling component be such as to produce a dye image possessing the most desirable characteristics of shade, density, fastness to light and to water. Many investigations in this art have been concerned with the discovery of proper light-sensitive diazo compounds which will have the necessary properties of decomposing on exposure to light, particularly light which emits rays in the 3600 Å. to 4200 Å. line and, in the undecomposed form, will combine with the azo coupling component to produce the desired image. When the diazo compound and the azo component are both contained in the light-sensitive layer in a two-component dry development system, it is further necessary that the diazo compound and the azo component be of such coupling capacity with respect to each other that they will not prematurely couple prior to exposure and development. The results of these investigations have generally proven that diazos derived from p-diamines of the benzene series are most suitable for the rigid requirements of two-component diazotypes. However, the use of this preferred class of diazo compounds does not necessarily reproduce the image in a shade of high contrast which has good fastness to light and to water. It is, therefore, an object of this invention to produce a diazotype combination which will reproduce the image in a shade of improved density, fastness to light and to water.

In the reproduction of drawings, printed material, pictures, or other originals to be copied, it is often of particular advantage to make an intermediate print or transition print on a transparent diazotype copying material by exposing a transparent sensitized diazotye material to actinic rays, such as ultraviolet light, by either the printing through or reflex process and then developing the diazotype exposure. The development of the diazotype material can be carried out by any of the methods known to the art for the development of exposed diazotypes. Thus, where a two-component system has been employed, which contains the azo component in the light-sensitive layer in combination with the diazo compound, development may be effected by passing the exposed diazotype through an atmosphere of ammonia vapors. Where a one-component system has been employed, which contains the diazo compound as the only dye component in the light-sensitive layer, the image is developed by treating the exposed diazotype with an alkaline solution containing the azo component by a dipping or fog spraying method. In either case, the image produced on the transparent intermediate or transition diazotype print can be used for the reproduction of further diazotype prints or, if desired, for the reproduction of the image on any photoprinting material capable of further reproducing the image.

This method of producing intermediate or transition diazotype prints is particularly useful when it is desired to make a large number of reproductions from a frail or valuable original which could not stand the wear of repeated exposures which would be necessary to make the desired number of copies. The efficiency of this process for the production of further photo copies from a transition or intermediate diazotype print depends upon the opacity of the azo dye image to ultraviolet light, and upon the transparency of the background to such light. It also depends upon the visual density of the image produced on the transition print. Images of poor visual density, such as light yellows on a white background, although they may have the desired degree of opacity to ultraviolet light, nevertheless have the disadvantage of rendering difficult the detection of flaws in the intermediate image.

Diazotype prints of a deep or dark color having good visual density have been obtained from diazotypes using azo components known to the art for general diazotype work, such as phloroglucinol, 2,3-dihydroxynaphthalene and β-naphthol-3,6-disulfonic acid. However, despite the good visual density of the colors obtained and, in some cases, the satisfactory fastness to light and to water of the image, they do not have the light opacity or photographic density necessary to reproduce the image satisfactorily in subsequent copies. The azo dye component used for the production of transition print images must be such as to produce, on coupling with the diazo compound employed, a color which will sufficiently absorb the ultraviolet light incident upon it during exposure to prevent light decomposition of the diazo compound in the areas to be reproduced from the transition copies. It is, therefore, a further object of this invention to produce a light-sensitive material which will reproduce the image of the original in a shade having improved photographic density or opacity to ultraviolet light.

Azo components, such as resorcinol, have heretofore been employed in the production of diazotype prints and others have been suggested in order to obtain color images having the necessary light absorption characteristics for transition printing. Resorcinol will reproduce the image on the transition print in a sepia or orange-brown color which has good visual density and good opacity to ultraviolet light. However, the prints obtained from these components are lacking in the properties of fastness to light and to water, and their coupling capacities are such that they do not have the proper resistance to premature coupling for use in two-component systems. The dye images produced on transparent intermediate prints, particularly when the support used for the print is a plastic unsupported film or a plastic coated base, have a tendency to diffuse, thereby reducing the contrast of the image and producing blurred effects on the final reproduced copy. A further object of this invention, therefore, is to produce a diazotype material which will reproduce the image of the original in a dye color which will not diffuse into a plastic base.

It has now been found that when using as the azo component for a diazotype reproduction medium, either in a developing solution for a one-component diazotype system or in the light-sensitive layer as part of a two-component dry developing diazotype system, the compound 2,2′,4,4′-tetrahydroxybiphenyl, there is obtained after proper exposure and development a reproduction of the original in a color having improved diazotype properties. The reproduced image will have good density, excellent fastness to light and to water, will not diffuse into plastic carriers and, when coupled with the usual p-phenylenediamine diazo compounds, will give a deep brown color possessing high actinic opacity which renders the diazotype material ideally suited for use in prints which are to be used for subsequent reprinting. The images reproduced by means of this azo component will remain sharp and have no tendency to "bleed" or to offset under pressure onto other plastic surfaces which are in contact with the surface carrying the reproduced image.

The azo component 2,2′,4,4′-tetrahydroxybiphenyl, which may be represented by the following structural formula

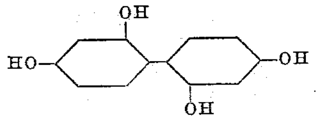

may be prepared from benzidine-2,2′-disulfonic acid by treatment with nitrous acid, boiling to hydrolyze, and fusing the dry dihydroxy compound with caustic.

In the preparation of the diazotype materials of this invention, a suitable base material such as paper, which may be transparentized if intended for transition printing, cellulose ester films such as cellulose acetate, regenerated cellulose films or other plastic film material, is coated by means known to the art with a light-sensitive composition containing suitable diazo compounds. Where it is desired to make a two-component diazotype layer, the azo component 2,2′,4,4′-tetrahydroxybiphenyl is also incorporated into the coating composition. Where one-component diazotype layers are desired, this azo component is added to an alkaline developing solution and, after exposure of the diazotype, the exposed image is developed by contacting it with the alkaline developing solution of the coupling component by means known to the art.

In the preparation of coating compositions for two-component diazotype materials, which constitutes the preferred method of applying this invention, the coating solution may also contain such other materials as are ordinarily used in the preparation of diazotype two-component light-sensitive coating compositions. These include stabilizing materials for the coating composition such as citric acid, phosphoric acid and thiourea; swelling agents for cellulose acetate and other cellulosic ester films such as isopropanol; and other adjuvants and addition agents designed to improve the resistance of the diazotype to premature coupling and prevent aging of the decomposition products in the background. As diazo compounds, any suitable light-sensitive diazo compound which will couple with the 2,2′,4,4′-tetrahydroxybiphenyl azo component to reproduce the desired colored image may be employed. It is preferred, however, to use diazo compounds derived from p-diamines of the benzene series. Other diazo compounds have been found suitable for use in these diazotypes, such as diazoanhydrides of o-amino hydroxy naphthalene compounds. The diazo compounds of p-diamines of the benzene series which are most suitable are those wherein the undiazotized amino group is substituted by such groups as alkyl, alkoxy, aryl, aralkyl, alkylol, alicyclic, aromatic, and heterocyclic groups. Examples of these diazo compounds are as follows:

p-Diazo-diethylaniline
4-diazo-2-methyl-N-ethylaniline
p-Diazo-diphenylamine
4-diazo-3-methyl-N-hydroxyethyl-N-ethylaniline
4-diazo-3-ethoxy-N-diethylaniline
4-diazo-1-benzoyl-amino-2,5-diethoxybenzene
1-N,N-dihydroxyethylamino - 3 - chloro-4-diazobenzene
p-Diazo-N-ethyl-N-benzylaniline
1-N-hydroxyethyl-N-ethylamino-4-diazobenzene
4-diazo-N,N-dihydroxyethylaniline
1-diazo-4-(4′ethoxyphenyl)-amino - 2,5 - diethoxybenzene
4-diazo-1-dimethylamino-3-methoxybenzene
N,N-dimethylamino-p-diazobenzene
p-Diazo-phenylamino-morpholine
2-diazo-1-naphthol-5-sulfonic acid These diazo compounds may be used in the form of their stabilized salts such as the $ZnCl_2$, $CdCl_2$, or $SnCl_4$ double salts, the fluoroborates, the aryl or alkyl sulfonates, or the acid sulfates of the diazonium chloride.

The following specific examples will serve to illustrate further the invention, it being understood, however, that they are not intended to limit its scope. Unless otherwise stated, the parts are by weight.

*Example I*

A coating solution is prepared by mixing the following materials into 100 cc. of water:

4 grams citric acid
2 grams boric acid
5 grams thiourea
2 grams 2,2′,4,4′-tetrahydroxybiphenyl
3 grams p-diazo-diethylaniline $ZnCl_2$ double salt This coating solution is coated onto diazotype paper stock by the usual method employed in applying a light-sensitive coating composition to a diazotype support. A trough and doctor-blade for insuring even distribution of the coating on the paper are most generally employed for this purpose. However, spraying or other equally effective methods of application may be substituted. The coated paper is then dried in the usual manner by drawing it through a heated drying chamber. Upon submitting the thus processed paper to accelerated aging tests or prolonged storage tests, it is found that a paper coated with this solution has a high degree of resistance to precoupling or spontaneous coupling while in storage. Upon exposing the coated and dried paper to proper actinic light such as light rich in ultraviolet emissions under an original pattern to be reproduced, and developing by drawing the exposed sensitized paper through an atmosphere of ammonia vapors the image is reproduced in a deep brown color of excellent contrast. The image thus produced has excellent light fastness and water fastness properties and is highly absorptive of ultraviolet radiation. In view of this last-named property, the prints are especially valuable as intermediate prints in the production of further copies. In view of the high resistance of the original light-sensitive coating to premature coupling, the intermediate print or duplicate original will have a clear white background unimpaired by coloration due to spontaneous coupling of the dye components prior to exposure. This clear background of the intermediate print, coupled with the high opacity to ultraviolet light of the brown image, makes it possible to reproduce the image on the intermediate print in sharp contrast on the copies.

*Example II*

A coating solution is made up by mixing the following materials into 50 cc. of water:

25 cc. isopropanol
5 grams citric acid
2 grams thiourea
5 grams formic acid
10 grams 2,2′,4,4′-tetrahydroxybiphenyl
10 grams 4-diazo-2-methyl-N-ethylaniline $ZnCl_2$ double salt This coating solution is coated onto cellulose acetate film by the previously-mentioned method of coating which allows for partial impregnation of the coating solution into the surface of the film. The film is then dried in the usual manner and submitted to accelerated aging and prolonged storage tests. It is found that the light-sensitive layer on the transparent cellulose acetate base, produced in accordance with this example, has a high degree of resistance to precoupling during storage or under conditions of accelerated aging. The coated and dried film is exposed to light rich in ultraviolet emission under an original to be reproduced, and the image developed by passing the exposed film through an atmosphere of ammonia vapors. The image is thus reproduced in an excellent brown-line print on a clear transparent background. The brown-line image of this reproduction is found to have high opacity to ultraviolet light. Because of this quality, and also in view of the clearness of the background, which latter is a result of the high resistance of the original coating to premature coupling, makes these transparencies eminently suitable for subsequent reprinting as duplicate originals.

*Example III*

A coating solution is prepared by mixing the following materials and then adjusting the volume with water to 100 cc.:

70 cc. water
6 cc. glycol
6 grams citric acid
3 grams boric acid
5 grams thiourea
3 grams 2,2′,4,4′-tetrahydroxybiphenyl
5 grams p-diazo-N-methyl-N-hydroxyethylaniline $ZnCl_2$ double salt
0.1 gram saponin This coating solution is applied to the surface of a 100% rag translucent paper stock by the trough and doctor blade method of application noted in Example I. The coated paper is then dried in the usual manner by drawing it through a heated drying chamber. Upon submitting samples of the thus processed paper to accelerated ageing tests or prolonged storage tests under severe conditions of temperature and humidity, it is found that a paper coated with this solution has a high degree of resistance to precoupling or spontaneous coupling while in storage.

Upon exposing the coated paper to actinic light, such as light rich in ultraviolet emissions, under an original pattern to be reproduced and developing by contact with an atmosphere of ammonia vapors, the image of the original is reproduced in an excellent brown-line print on a clear transparent background. The brown-line image of this reproduction has high opacity to ultraviolet light. It is, therefore, eminently suitable for use as an intermediate or master copy for the subsequent reprinting of additional copies on photo-sensitive material.

We claim:

1. A diazotype photoprinting material containing 2,2′,4,4′-tetrahydroxybiphenyl as an azo dye coupling component and a light-sensitive diazo compound.

2. A diazotype photoprinting material containing 2,2′,4,4′-tetrahydroxybiphenyl as an azo dye coupling component and a light-sensitive monodiazo compound of a p-diamino benzene compound.

3. A diazotype photoprinting material containing 2,2′,4,4′-tetrahydroxybiphenyl as an azo dye coupling component and a light-sensitive monodiazo benzene compound having a substituted amino group in para position to the diazo group.

4. A diazotype photoprinting material containing 2,2′,4,4′-tetrahydroxybiphenyl as an azo dye coupling component and p-diazo diethylaniline as the light-sensitive component.

5. A diazotype photoprinting material containing 2,2′,4,4′-tetrahydroxybiphenyl as an azo dye coupling component and 4-diazo-2-methyl-N-ethylaniline as the light-sensitive component.

6. A diazotype photoprinting material containing 2,2',4,4'-tetrahydroxybiphenyl as an azo dye coupling component and p-diazo-N-methyl-N-hydroxyethyl aniline as the light-sensitive component.

G. WESLEY PEDLOW, JR.
FRED W. NEUMANN.

REFERENCES CITED

The following references are of record in the file of this patent:

UNITED STATES PATENTS

| Number | Name | Date |
| --- | --- | --- |
| 2,039,730 | Mannes et al. | May 5, 1936 |
| 2,346,080 | Porter et al. | Apr. 4, 1944 |
| 2,432,593 | Straley | Dec. 16, 1947 |